No. 698,667. Patented Apr. 29, 1902.
T. DUNCAN.
ELECTRIC METER.
(Application filed Nov. 10, 1899. Renewed Jan. 6, 1902.)
(No Model.)
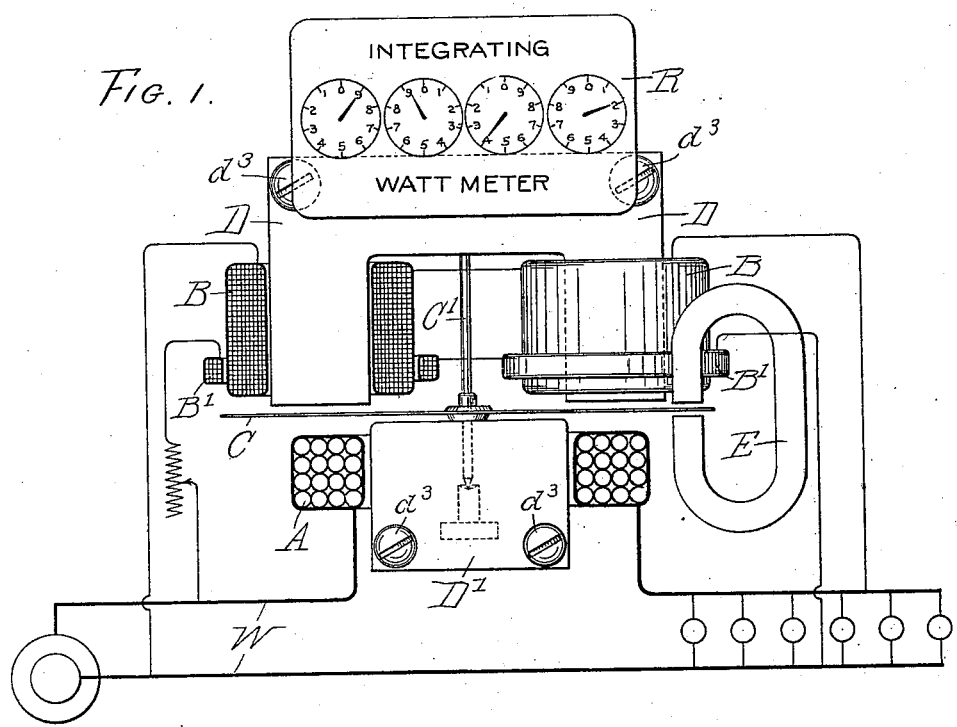
Fig. 1.
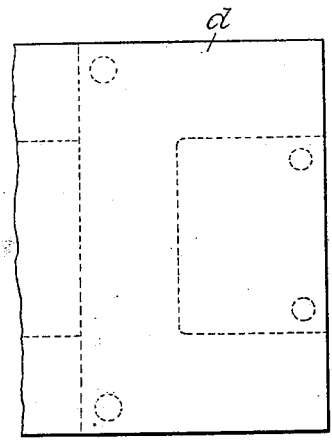
Fig. 2.
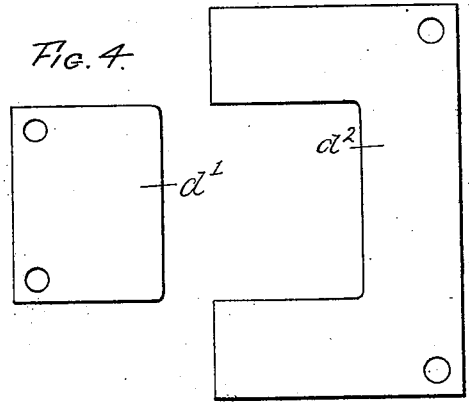
Fig. 3.
Fig. 4.
Witnesses
Samuel R. Bachtel
M. E. Marsh
Inventor
Thomas Duncan
By his Attorneys
Carter & Graves
THE NORRIS PETERS CO., PHOTO-LITHO., WASHINGTON, D. C.

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,667, dated April 29, 1902.

Application filed November 10, 1899. Renewed January 6, 1902. Serial No. 88,484. (No model.)

*To all whom it may concern:*

Be it known that I, THOMAS DUNCAN, a citizen of the United States, and a resident of Chicago, in the county of Cook and the State of Illinois, have invented certain new and useful Improvements in Electric Meters, (Case No. 64,) of which the following is a specification.

This invention relates to improvements in integrating wattmeters of the induction-motor type for use in alternating-current systems of electrical distribution.

The object of the invention is to produce a simplified design of meter which will be capable of being economically constructed and which at the same time will be accurate in its measurements under all conditions and changes of service and load inductance.

In the accompanying drawings, Figure 1 is a front elevation, partially diagrammatic, of an integrating wattmeter embodying my improvements. Fig. 2 shows the manner in which the laminæ of the magnetic cores are punched from a sheet of metal without waste. Fig. 3 shows a U-shaped lamina as it appears on leaving the punch, and Fig. 4 the shape of the parts punched out of the U-shaped lamina and which form the laminæ of the other core.

A designates the series field-coil of the meter; B, its volt or shunt field-coils, two in number, and C a disk armature that is mounted to rotate freely between said series and volt-coils upon a spindle C', to which an ordinary registering mechanism R is suitably geared. As herein shown, the volt-coils B are placed above the armature upon the downwardly-projecting poles of an inverted-U-shaped magnetic core D, while the series coil A is placed below the armature upon a rectangular magnetic core D', all of the coils being located, as usual, away from the center of the armature, so that there is no interference with the spindle C', which in the view shown in Fig. 1 passes behind the coils and their magnetic cores, as indicated by dotted lines in said figure. The coil A is connected in series in the work-circuit W and the coils B in shunt across the line, the self-inductance of the latter coils producing a phase displacement by reason of which the armature will be inductively rotated. The lag produced by the core D alone will not, however, amount to ninety degrees, as is now well understood by those skilled in this art, and to increase such lag to the full quadrature necessary to accurate service under all conditions of load inductance auxiliary volt-coils B' are mounted in inductive relation with respect to the main volt-coils B and connected reversely thereto in shunt across the work-circuit W, with the effect of producing a resultant magnetic field lagging the full ninety degrees desired. The usual magnetic drag E serves to maintain the armature rotations proportional to the torque exerted.

The magnetic cores D and D' of the meter thus described are complementary, the rectangular core D' of the series coil being of just the size and shape of the opening or recess in the core D between the poles of the latter, and all of the proportions of the meter are calculated with reference to this condition. In forming said cores a strip of sheet iron or steel is fed beneath a punching-press, which cuts off a rectangular piece $d$ and also removes a rectangular portion $d'$ from the middle of one side of this piece, leaving a remaining U-shaped portion $d^2$. A sufficient number of said U-shaped laminæ are then assembled and secured together in any suitable manner, as by clamping-screws $d^3$, to constitute said core D, while the same number of rectangular laminæ $d'$, punched out in forming said U-shaped laminæ, are similarly assembled and secured together to constitute the core D'. As the consequence of this mode of construction all waste of material in forming the laminated cores is done away with and the cost of manufacture thereby considerably lessened. The novel design of meter provided is at the same time of exceeding simplicity and additionally conducive to ease and low cost of manufacture without any sacrifice in accuracy or capacity otherwise for satisfactory service under both inductive and non-inductive loads.

I claim as my invention—

1. An electric meter provided with a rotary armature, a series field-coil mounted adjacent to the armature upon a rectangular magnetic core, and a pair of volt field-coils mounted upon the opposite side of the armature upon the poles of a U-shaped magnetic core, substantially as described.

2. An electric meter provided with the series coil A, volt-coils B, and armature C mounted on a spindle C′ geared to a registering mechanism R, U-shaped laminated core D having volt-coils mounted on its poles, and a laminated core D′ upon which the series coil A is mounted, said cores being formed of laminæ $d^2$ and $d'$ of which the laminæ $d'$ are of the shape and size of the space between the poles of the laminæ $d^2$ and can be struck without waste from the latter, substantially as described.

3. An electric meter, comprising a disk armature C mounted on a spindle C′ connected with a registering mechanism, volt-coils B and auxiliary volt-coils B′ mounted above the armature upon the downwardly-projecting poles of a U-shaped laminated core D, and series coil A mounted beneath the armature upon the upwardly-projecting laminated core D′, substantially as described.

In testimony that I claim the foregoing as my invention I affix my signature, in presence of two subscribing witnesses, this 2d day of November, A. D. 1899.

THOMAS DUNCAN.

Witnesses:
WM. F. MEYER,
JNO. W. MCKENZIE.